(12) United States Patent
Schmack

(10) Patent No.: US 6,302,416 B1
(45) Date of Patent: Oct. 16, 2001

(54) CAMBER ADJUSTMENT ARRANGEMENT

(75) Inventor: Bernhard Schmack, Fulda (DE)

(73) Assignee: Hendrawati Schmack (DE)

( * ) Notice: Subject to any disclaimer, the term of this patent is extended or adjusted under 35 U.S.C. 154(b) by 0 days.

(21) Appl. No.: 09/194,711

(22) PCT Filed: Jun. 16, 1997

(86) PCT No.: PCT/EP97/03124

§ 371 Date: Jul. 9, 1999

§ 102(e) Date: Jul. 9, 1999

(87) PCT Pub. No.: WO97/48588

PCT Pub. Date: Dec. 24, 1997

(30) Foreign Application Priority Data

Jun. 17, 1996 (DE) .............................................. 296 10 634

(51) Int. Cl.⁷ .................................................. B60G 7/00
(52) U.S. Cl. .................................. 280/93.512; 280/86.75; 280/86.751; 280/86.754; 280/86.755; 280/661
(58) Field of Search .............................. 280/661, 86.754, 280/86.751, 86.75, 93.512, 86.755

(56) References Cited

U.S. PATENT DOCUMENTS

| 2,631,866 | 3/1953 | Leighton ............................ 280/96.2 |
| 4,971,352 | * 11/1990 | Jordan ................................ 280/661 |
| 5,044,659 | * 9/1991 | Specktor et al. .................... 280/661 |
| 5,104,141 | * 4/1992 | Grove et al. ........................ 280/661 |
| 5,398,411 | * 3/1995 | Kusaka et al. ..................... 280/661 |
| 5,647,606 | * 7/1997 | Jordan ................................ 280/661 |
| 5,779,260 | * 7/1998 | Reilly et al. ........................ 280/661 |
| 5,816,605 | * 10/1998 | Raidel, Sr. .......................... 280/661 |
| 6,027,129 | * 2/2000 | Kleinschmit et al. ............... 280/661 |

FOREIGN PATENT DOCUMENTS

| 964 748 | * 5/1957 | (DE) . |
| 37 14689 A1 | * 2/1987 | (DE) . |
| 3714689 A1 | 11/1988 | (DE) . |
| 0638448 A2 | 2/1994 | (EP) . |
| 2 227 721 | * 1/1990 | (GB) . |
| 2227721 A | 8/1990 | (GB) . |

* cited by examiner

Primary Examiner—Lanna Mai
Assistant Examiner—Toan C To

(57) ABSTRACT

A screw bolt has shank portions of different thicknesses which are arranged along two mutually displaced axes and cooperate with securing walls of a spring strut and with a steering knuckle respectively in the manner of cams or eccentrics in order to adjust the camber between the spring strut and the wheel suspension.

23 Claims, 3 Drawing Sheets

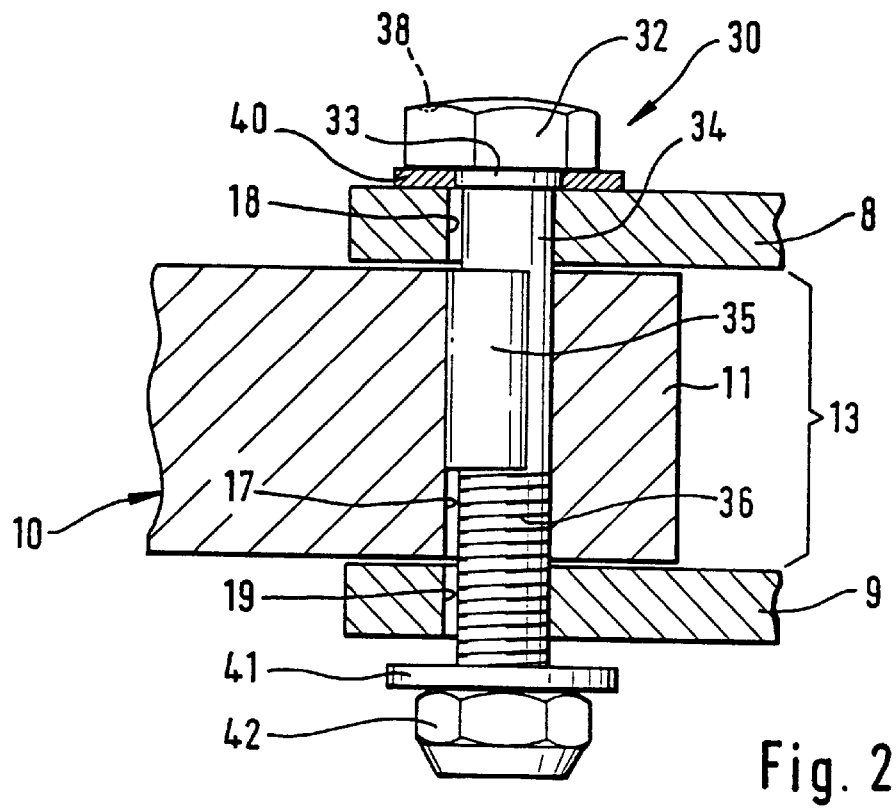
Fig. 2
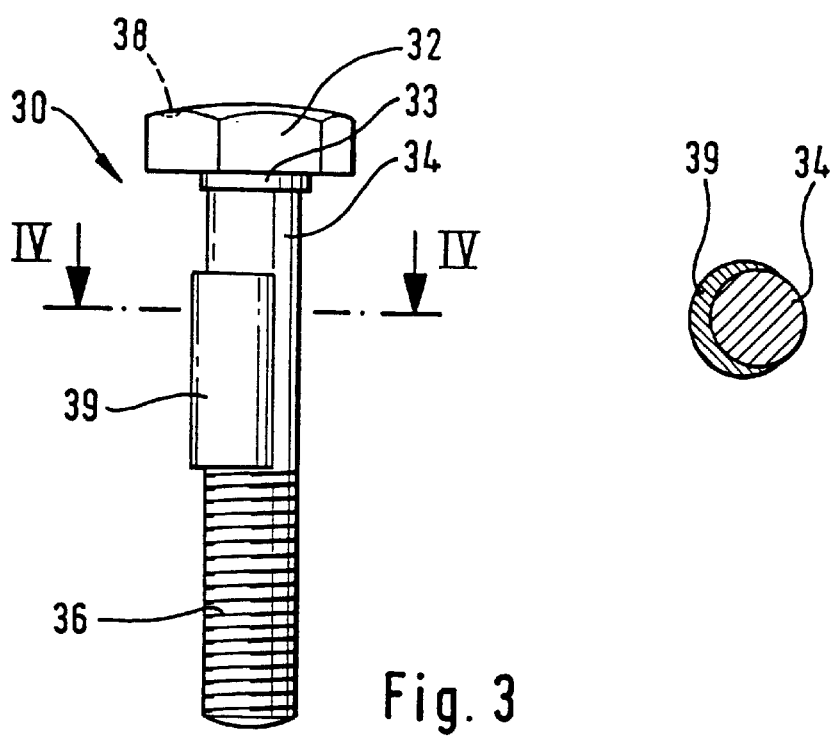
Fig. 3
Fig. 4

CAMBER ADJUSTMENT ARRANGEMENT

FIELD OF THE INVENTION

The invention relates to an arrangement for camber adjustment between the spring strut and the wheel suspension having the features set forth in the classifying portion of claim 1.

BACKGROUND OF THE INVENTION

In four-wheeled automobiles the stub axle of the front wheels does not extend precisely horizontally but is slightly inclined, that angle of inclination or the angle of the plane of the wheel relative to the vertical being referred to as the camber. The camber angle is usually fixed at the factory and under normal circumstances does not have to be re-adjusted before the end of the service life of the automobile. After accidents have occurred however it can happen that the tracking of the wheels of the automobile has changed so that it is desirable to be able to adjust the angles which influence tracking, including camber. The same applies in regard to certain repairs or structural modifications to the vehicle.

It is known for the holder of the spring strut to be provided with at least one slot in order to be able to displace the steering knuckle relative to the spring strut before the screws passing therethrough are tightened. Such displacement is effected when the screws are half-tightened by means of hammer blows and is therefore not very desirable, having regard to measuring instruments used. Therefore, the attempt has also already been made to find a gentler method of adjusting camber and use has been made of a washer with an eccentric contour which bears against an edge bar portion of the holder in order to move the screw shank in the slot when the washer is rotated. That procedure presupposes structural features on the holder, which are present on very few vehicles, not even on newer types of manufacturers of vehicles with the eccentric washer.

SUMMARY OF THE INVENTION

The object of the present invention is to provide a simple way of effecting subsequent camber adjustment.

That object is attained by claim 1 and the further features of the appendant claims are directed to embodiments and further developments thereof.

For the purposes of adjusting camber, use is made of a screw with cam or eccentric, which connects the spring strut to the wheel suspension. Provided on the screw itself is a marking in order to indicate the angular position thereof in respect of the cam or eccentric. Starting from an extreme or limit position, a change in the angular position of the cam or eccentric changes the position of the steering joint in space, and therewith also the camber angle. The position once set is fixed by tightening the nut of the screw connection.

The invention is described with reference to the drawing in which:

FIG. 2 is a view on an enlarged scale in section taken along line II—II in FIG. 1, FIG. 3 is a side view of a camber screw, FIG. 4 is a view in section taken along line IV—IV in FIG. 3.

Figure 1:
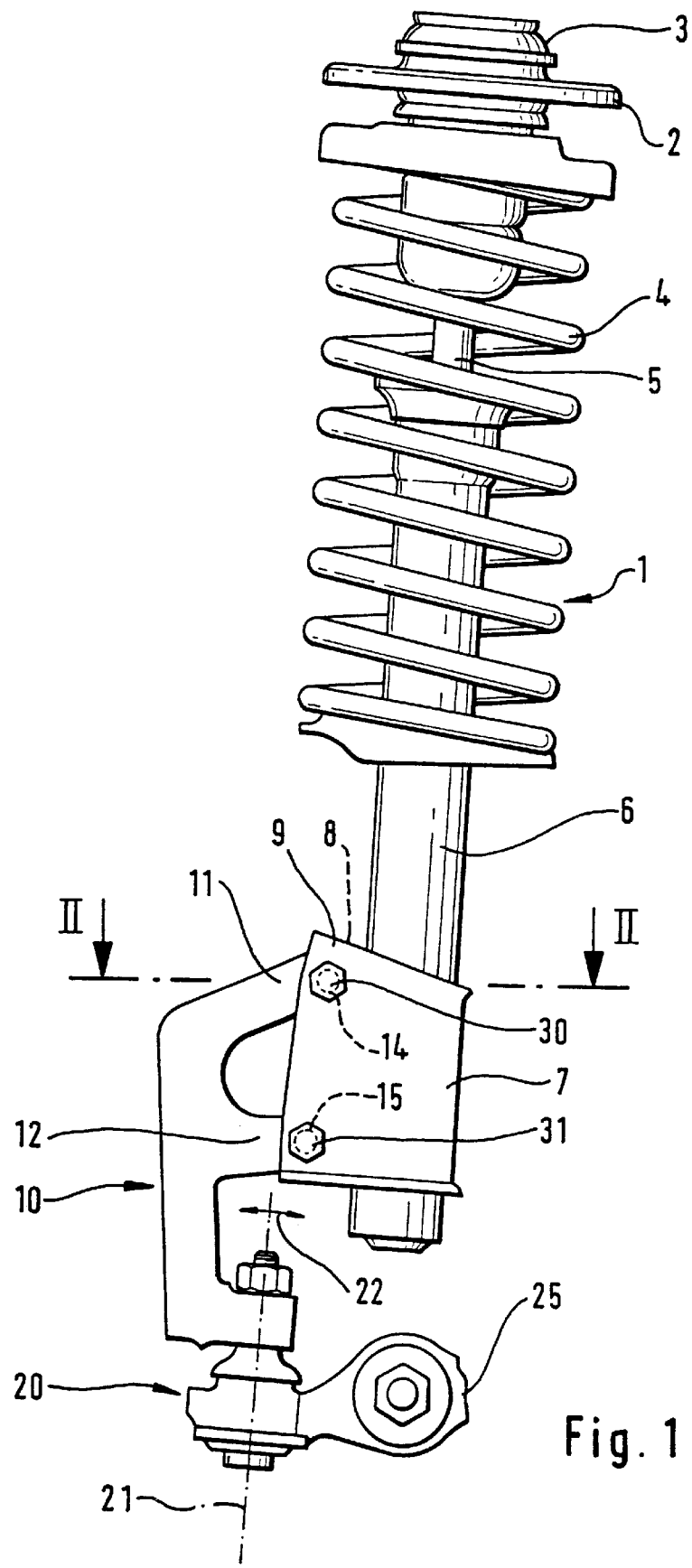
FIG. 1 is a side view of a spring strut with steering knuckle screwed thereto.

Referring to FIG. 1 shown therein is a spring strut 1 which is supported at 2 on the bodywork of the vehicle and which has a spring strut support bearing 3, a coil spring 4, a piston rod 5 and a shock-absorber or damper cylinder 6. Secured to the damper cylinder 6 is a holder 7 which extends around the lower end of the cylinder 6 and can be welded thereto and has two securing walls 8 and 9 of side plate type configuration, for securing a stub axle carrier or steering knuckle 10 thereto. The steering knuckle 10 has a forked extension with two ends 11, 12 which extend into the intermediate space 13 between the walls 8, 9. Mounted to the lower end of the steering knuckle 10 is a steering joint 20, the axis 21 of which, in space, defines the camber. The steering joint 20 is held by tie links 25 which are pivotably mounted to a front axle carrier (not shown).

As can be seen from FIG. 2 the securing walls 8 and 9 of the holder 7 extend in mutually parallel relationship and define the intermediate space 13 into which the forked steering knuckle extension extends, with its ends 11, 12. Extending through the parts 7, 10 (FIG. 1) are an upper bore 14 and a lower bore 15 through which extend an upper screw bolt 30 and a lower screw bolt 31 respectively. Accordingly each bore 14, 15 in the holder 7 has a (generally round) insertion bore region 18 (FIG. 2) and a (generally round) exit bore region 19 and, in the steering knuckle 10, a cylindrical bore 17.

The screw bolt 30 has a head 32, a cylindrical trunnion portion or collar 33, a cylindrical shank 34 or neck, an eccentric 35 and a screwthreaded region 36. The radial position of the eccentric 35 is marked on the head 32 at 38, for example by a shallow hole, a burn spot or a notch. Fitted on to the trunnion portion 33 and the screwthreaded region 36 are washers 40, 41 and a nut 42 is screwed on to the screw bolt. The nut 42 is provided with a device for preventing the nut from coming undone of its own accord and is immovably tightened after adjustment of the components.

In order to permit adjustment of the components, the diameter of the neck 34 is about 2 mm smaller than the greatest width of the bore region 18. The same applies in regard to the dimensions of 36 and 19 while the eccentric 35 just fits into the bore 17.

The screw 30 can be turned from one piece; it is however also possible to secure a clip-like cam 39 in position in the middle region of the screw shank 34, for example by adhesive means, soldering or welding (see FIG. 4). The screw 30 comprises high-strength steel which, in spite of a reduced diameter, can be prestressed to give the necessary contact pressure force of the washers 40, 41 when the nut 42 is tightened.

Adjustment of the camber is effected as follows:

It will be assumed that the screw 30 has been fitted through the bores 18, 17 and 19 with the marking 38 downwardly (that is to say on the connecting line relative to the screw 31) and the nut 42 has been tightened. The nut is screwed on to the screw until the washers 40, 41 bear against the walls 8, 9, more specifically with such a contact pressure that the washers 40 and 41 do not slip when the position of the steering knuckle 10 is adjusted. In that case, the screw 30 is turned clockwise or counter-clockwise, in which case the marking 38 indicates the direction in which the eccentric 35 or the cam points. The double-headed arrow 22 in FIG. 1 shows the two directions in which the steering knuckle 10 can be displaced or the axis 21 inclined in order to correctly set the camber. When it has been found by measurement that the camber adjustment is correct, the nut 42 is tightened with a prescribed torque.

Depending on the camber range to be adjusted, one (30) or two (30+31) special screws according to the invention are used. The invention can be used in relation to cylindrical bores 18, 19 in the holder, but also in relation to slots in the holder. Respectively appropriate special screws are provided for different bore sizes so that it is possible to service practically all types of vehicle that occur.

Figure 5:
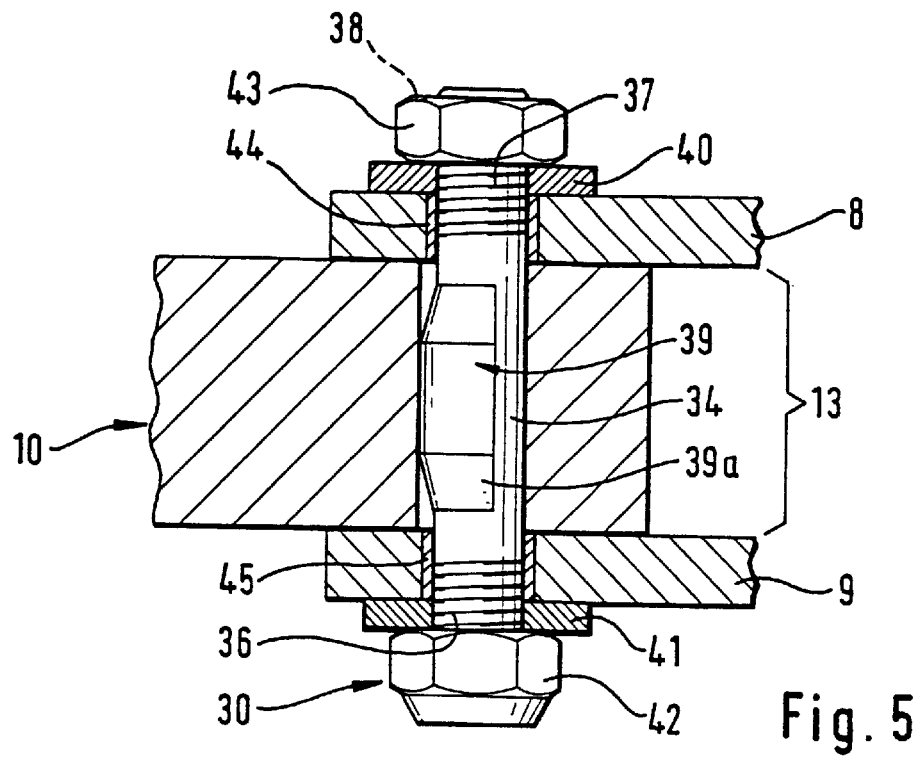
FIG. 5 is a view in section through an alternative configuration.

FIG. 5 shows an alternative configuration of the camber adjustment arrangement in a view in section similar to FIG. 2. Instead of an integral eccentric 35, this arrangement uses a cam 39 which is fitted on to the screw bolt and which is provided with conical inclined insertion surface portions 39a. The cam 39 is fixedly connected to the shank 34 of the screw bolt 30, as described with reference to FIGS. 3 and 4. The head 32 and the trunnion portion 33 however are replaced by a further screwthreaded region 37 and a nut 43. In addition the gaps between the bore regions 18 and 19 and the shank 34 and the screwthreaded region 36 respectively are filled by bushes or sleeves 44 and 45 so that the screwthreaded bolt 30 is held in central relationship with the bore regions 18 and 19. The other parts correspond to the parts described with reference to FIG. 2.

Assembly of the screw bolt shown in FIG. 5 is as follows:

The damper cylinder 6 with its holder 7 is so oriented with respect to the steering knuckle 10 that the screws 30 and 31 can be fitted through the bores 14 and 15. In that respect, the bevel portions 39a on the cam 39 are advantageous. If not already done, the nut 43 is unscrewed and the damper cylinder 6 or the steering knuckle 10 is moved in such a way that the bushes or sleeves 44 and 45 can be fitted into the bore regions 18 and 19. The washers 40 and 41 are then fitted on to the respective ends of the screw bolt 30 and the nuts 42 and 43 are screwed on. The nut 43 is to be converted in function to act as a screw head, and for that reason it is possible to apply a two-component adhesive to appropriate locations of the screwthread of the nut 43 or the screwthread region 37 respectively, before the nut 43 is screwed on. Provided on the nut 43 is the marking 38 which is turned in the same radial direction as the cam 39. After hardening of the two-component adhesive, camber adjustment can be implemented, as already described with reference to FIG. 2.

Fixing of the nut 43 to form the screw head can also be effected by means of a spot weld which can then form the marking 38 at the same time.

The embodiment shown in FIG. 5 has the advantage that, besides the cam 39 fitted on to the bolt, it is possible to operate with conventional parts. It will be appreciated that in that respect a high-strength material is adopted for the screw bolt in order to compensate for the reduction in diameter by about 2 mm which occurs in comparison with the original configuration for securing the damper cylinder and the steering knuckle to each other, when involving cylindrical bores 18 and 19 in the walls 8 and 9 of the holder 7. The invention therefore makes it possible to implement subsequent camber adjustment even in cases when no provision had been made for such camber adjustment from the outset (due to the absence of slots or relatively wide bores).

The embodiment of FIG. 5 can also be modified in such a way that the end with the screwthreaded region 37 has a device for rotating the bolt shank 34, for example a recess configuration. In such a case the marking 38 is provided on the bolt shank 34 in order to indicate the radial orientation of the cam 39, on the outside. Similar nuts 42 and 43 are then adopted. This modified embodiment is easier to dismantle although dismantling that is still easy is also afforded by heating the two-component adhesive in the case of the embodiment shown in FIG. 5.

Figure 6:
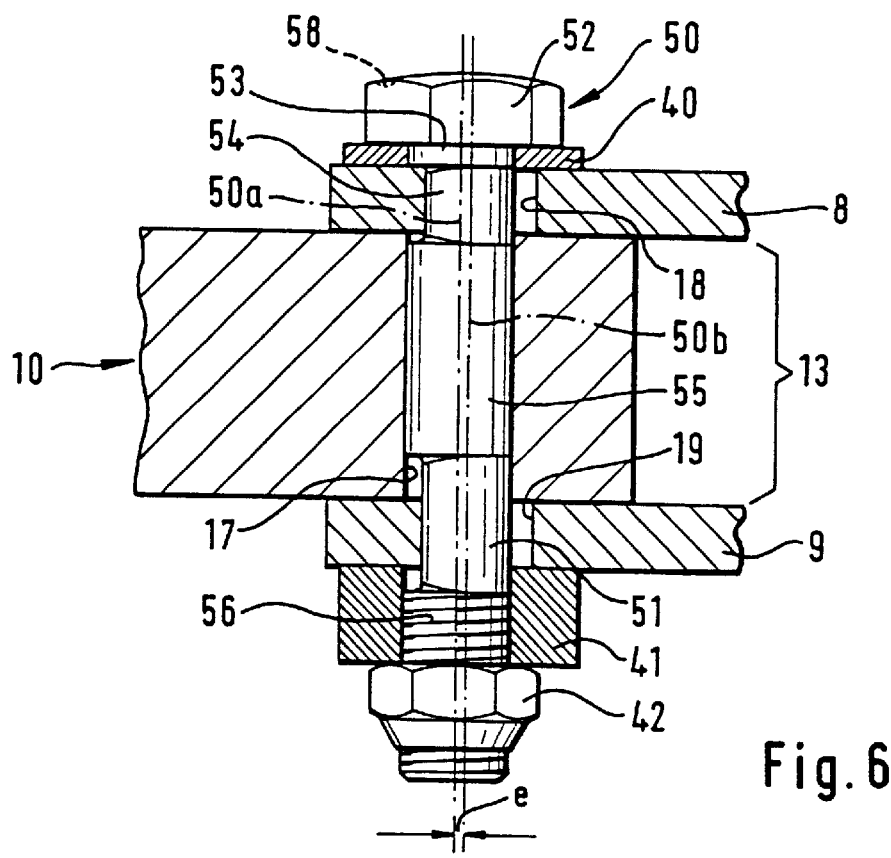
FIG. 6 shows a further adjustment arrangement.

FIG. 6 shows a further embodiment of the camber adjustment arrangement. Parts which are the same as parts described hereinbefore are denoted by the same references. This arrangement uses a screw 50 with an axis 50a, relative to which an eccentric axis 50b is formed at a spacing e. Disposed on the eccentric axis 50b are a shank portion 51 and a further shank portion 54. The other elements of the screw 50 are disposed symmetrically with respect to the axis 50a, more specifically the head 52, a trunnion portion or shoulder 53, a cam projection 55 and a screwthreaded region 56. The elements 53, 55 and 56 are of the same outside diameter, for example 16 mm. The diameter of the elements 51 and 54 is then 14 mm. It is however also possible to use other dimensions, for example 14 mm for the elements 53, 55 and 56 and 12 mm for the elements 51 and 54. Finally, it is also possible for the elements 53 and 55 to be somewhat thicker than the element 56, for example 17 mm in comparison with M16 of the screwthreaded region 56 or 15 mm in comparison with M14 of the screwthreaded region 56. For the length of the screw without a head, a range of between 75 and 95 mm is envisaged. The screw bolt 50 is drop-forged in the rough condition and the screwthread is produced in conventional manner. The material used for the screw bolt is high-strength steel, the strength of which is greater than that of the screws usually employed for securing the spring strut 1 to the steering knuckle 10.

The camber adjustment arrangement is used as follows:

First of all the wheel camber of the vehicle at which camber adjustment is to be effected is ascertained. The wheels on the axle in question of the vehicle are removed. The screw at the position 30 in FIG. 1 is released and removed. In its place, the screw 50 is fitted at the bore 14 which is now empty. It is to be noted that the correct screw size and length are to be selected from the set provided. Additional holders which were possibly previously removed are fitted as previously. Thereafter, the camber is set to its maximum negative or positive angular value, with the marking 58 on the screw 50 facing inwardly for negative camber and outwardly for positive camber. By applying a pulling or pushing force, the wheel carrier of the vehicle is moved into an end position as corresponds to the position of the marking 58 on the screw 50. The connection formed is arrested by slightly tightening the nut 42 so that no change in the camber occurs when the loading due to the weight of the vehicle is applied. The wheel or wheels is or are now fitted and the measuring apparatus for measuring camber is installed. The screw 50 is rotated at the screw head 52, whereby the walls 8 and 9 of the holder 7 are displaced relative to the steering knuckle 10. The head 52 is rotated until the desired camber angle is achieved. The wheel in question is then carefully removed again without changing the camber adjustment made. The screw connection is fixed by tightening the nut 42 (without altering the position of the head 52) and by tightening the nut on the screw 31, using a torque of between 90 and 110 Nm. The wheel is fitted again and the wheel bolts or nuts are tightened to the prescribed torque. Care is taken to ensure that the tire of the wheel has sufficient spacing relative to all fixed parts of the vehicle.

What is claimed is:

1. An arrangement for camber adjustment on a vehicle having spring struts and associated wheel suspensions having at least one spring strut having a holder which is secured to a damper cylinder and has two parallel securing walls which define an intermediate space and are provided with two bores which each have a bore portion for the one securing wall and a bore portion for the other securing wall; at least one wheel suspension having a steeringjoint which is connected to the holder by way of a steering knuckle having a steering knuckle extension extending into the intermediate space of the holder, said steering knuckle extension has two transverse bores which are aligned with the bore portions of the holder, said arrangement comprising:

- a pair of screw bolts of a length to extend through the bores in the holder and the transverse bores in the steering knuckle extension and which are each provided with a respective screw threaded region to secure a respective steering knuckle to the associated spring strut by virtue of a nut which is screwed on to the associated screw threaded region, at least one screw bolt is in the form of an adjustment screw bolt and has at least two shank portions which are in axis-displaced relationship with respect to each other, the shank portions being of different thickness dimensions which determine an adjustment dimension, the adjustment screw bolt includes a marking which indicates an angular position of the axis-displaced shank portions, shank portions of the adjustment screw bolts which co-operate with the securing walls are thinner by the adjustment dimension that corresponds to the cross-section of the bore portions of the holder defining a gap between these shank portions and the securing walls, and a shank portion which co-operates with the steering knuckle extension is disposed non-rotatably on the adjustment screw bolt and is thicker by the adjustment dimension than the thinner shank portions which cooperate with the securing walls, wherein the thickness of said shank portion which cooperates with the steering knuckle extension is selected to match the cross-section of the transverse bore in the steering knuckle extension in which the adjustment screw bolt in question is fitted.

2. An arrangement as set forth in claim 1 wherein the adjustment screw bolt has a screw head and two thinner shank portions of smaller diameter arranged concentrically with respect to the screw head, and the shank portion co-operating with the steering knuckle extension is a cam or eccentric region which is arranged eccentrically with respect to the screw head and between the two thinner shank portions of smaller diameter.

3. An arrangement as set forth in claim 1 wherein the adjustment screw bolt has a screw head and two thinner shank portions of smaller diameter, which are arranged eccentrically with respect to the screw head, and the shank portion which co-operates with the steering knuckle extension has a larger diameter than the thinner shank portions and is arranged concentrically with respect to the screw head and between the thinner shank portions.

4. An arrangement as set forth in claim 3 wherein the screw threaded region is of a diameter which is larger than the diameter of the thinner shank portions but does not exceed the diameter of the shank portion which co-operates with the steering knuckle extension.

5. An arrangement as set forth in claim 1 wherein the axis displacement of the axis-displaced shank portion is about 2 mm.

6. An arrangement as set forth in claim 1 wherein the adjustment screw bolt includes a screw head which carries the marking and on which a cylindrical trunnion is disposed.

7. An arrangement as set forth in claim 1 wherein the screw bolt has a shank with screw threaded regions at both ends and bushes are disposed surrounding the shank to fill gaps in relation to the securing walls of the holder, and an end of the shank is prepared for rotation of the shank.

8. An arrangement as set forth in claim 7 which also comprises a nut secured by an adhesive to the screw threaded region of the end of the shank prepared for rotation.

9. An arrangement as set forth in claim 7 which also comprises a recess in the end of the shank which is prepared for rotation.

10. An arrangement as set forth in claim 2 wherein the axis displacement is about 2 mm.

11. An arrangement as set forth in claim 3 wherein the axis displacement is about 2 mm.

12. An arrangement as set forth in claim 4 wherein the axis displacement is about 2 mm.

13. In an arrangement for camber adjustment on a vehicle having spring struts and associated wheel suspensions, wherein each spring strut has a holder which is secured to a damper cylinder and has two parallel securing walls which define an intermediate space and are provided with two bores which each have a bore portion for one securing wall and a bore portion for the other securing wall, said bore portions having a bore portion diameter, each wheel suspension also has a steering joint connected to the holder by way of a steering knuckle having a steering knuckle extension extending into the intermediate space of the holder, the steering knuckle extension has two transverse bores which are aligned with the bore portions of the holder, said transverse bores having a transverse bore diameter, and screw bolts extending through the bores in the holder and the transverse bores in the steering knuckle extension each provided with a respective screwthreaded region to secure a respective steering knuckle to the associated spring strut by a nut screwed on to the associated screwthreaded region, said arrangement having an adjustment screw bolt for replacing one of said screw bolts, said adjustment screw bolt comprising:

- a screw head;
- means defining a marking so as to indicate an angular position of the screw bolt relative to said bore portions of said securing walls;
- a first and a second shank section defining a first axis, said first and second shanksections being of a thinner diameter than said bore portion diameter and arranged at a distance to one another so as to cooperate with said securing walls;
- a third shank section forming a cam and defining a second axis, said third shank section being of a cam diameter corresponding to said transverse bore diameter of said steering knuckle extension and arranged between said first and second shank sections;
- said first and second axes defining an adjustment direction indicated by said marking, and a threaded section, said threaded section having an outer diameter which is larger than the diameter of said first and second shank sections and not greater than said cam diameter.

14. The adjustment screw bolt set forth in claim 13, wherein said screw head, said third shank section and said threaded section are arranged concentrically to said second axis.

15. The adjustment screw bolt set forth in claim 13, wherein the diameter of saidfirst and second shank sections is smaller than said outer diameter of said threaded section by about 2 mm.

16. The adjustment screw bolt set forth in claim 13, wherein said first and second axes are spaced apart by a distance of about 1 mm.

17. The adjustment screw bolt set forth in claim 13, wherein said first shank section has a cylindrical trunnion portion and said screw head has said marking on it and is integrally connected to the cylindrical trunnion portion of said first shank section.

18. A camber adjustment arrangement for a vehicle having spring struts and associated wheel suspensions, wherein each spring strut has a holder which is secured to a damper cylinder and has two parallel securing walls which define an intermediate space and are provided with two bores which each have a bore portion for the one securing wall and a bore portion for the other securing wall, said bore portions having a bore portion diameter, each wheel suspension also has a steering joint connected to the holder by way of a steering knuckle which extends with a steering knuckle extension into the intermediate space of the holder and the steering knuckle extension has two transverse bores which are aligned with the bore portions of the holder, said transverse bores having a transverse bore diameter, and screw bolts extend through the bores in the holder and the transverse bores in the steering knuckle extension and are each provided with a respective screwthreaded region to secure a respective steering knuckle to the associated spring strut by a nut screwed on to the associated screwthreaded region, an adjustment screw bolt for replacing one of said screw bolts, said adjustment screw bolt comprising:

a cylindrical body having two ends forming screw threaded regions and a shank region arranged between said screw threaded regions and including smooth surfaces defining a shank diameter, one of said ends including means for rotating said cylindrical body relative to said steering knuckle and a pair of bushes, each bush being concentric to the shank region and having an outer diameter corresponding to said bore portion diameter, and an inner diameter corresponding to said shank diameter, means on said cylindrical body forming a cam arranged on said shank region, and means defining a marking so as to indicate an angular position of said cam relative to said bore portions of said securing walls.

19. The adjustment screw bolt set forth in claim 18, wherein said means for rotating said cylindrical body includes a nut which is fixed to one of said screw threaded regions by an adhesive.

20. The adjustment screw bolt set forth in claim 18, wherein said means for rotating said cylindrical body includes a recess configuration.

21. In an arrangement for camber adjustment on a vehicle having spring struts and associated wheel suspensions, wherein each spring strut has a holder which is secured to a damper cylinder and has two parallel securing walls which define an intermediate space and are provided with two bores which each have a bore portion for the one securing wall and a bore portion for the other securing wall, said bore portions having a bore portion diameter, each wheel suspension also has a steering joint connected to the holder by way of a steering knuckle which extends with a steering knuckle extension into the intermediate space of the holder and has two transverse bores which are aligned with the bore portions of the holder, said transverse bore having a transverse bore diameter, screw bolts extending through the bores in the holder and the transverse bores in the steering knuckle extension and which are each provided with a respective screwthreaded region to secure a respective steering knuckle to the associated spring strut by a nut screwed on to the associated screwthreaded region, and an adjustment screw bolt for replacing one of said screw bolts, said adjustment screw bolt comprising:

a screw head;
a shank defining a screw bolt axis and having a first and a second end, said first end being integrally formed with said screw head, means on said screw head which indicate an angular position of the screw bolt relative to said bore portions of said securing walls;
said second end of said shank being formed with a thread on a complete round cylindrical region without any weakening slot or groove;
a cam carried by said shank; and
a neck portion formed by an unobstructed smooth cylindrical portion of said shank which is arranged between said head and said cam for cooperation with one of said bore portions directly, without interfering means;
said cam having a diameter corresponding to said transverse bore diameter, and said neck portion having a diameter which is less than said cam diameter by an adjustment value.

22. The adjustment screw bolt of claim 21 wherein a cylindrical trunnion portion is integrally formed with said head and said neck portion.

23. An arrangement for camber adjustment on a vehicle between a spring strut and a steering knuckle or a wheel suspension, comprising:

a holder having a pair of parallel securing walls which define an intermediate space and are provided with first and second holes parallel to one another;
each hole of the holder having a first hole region in one of said parallel walls and a second hole region in the other of said parallel walls;
said hole regions each defining a first hole diameter;
said holder being secured to a damper cylinder which is a member of said spring strut;
said steering knuckle having wall portions extending into said intermediate space and having third and fourth holes parallel to one another and being of essentially said first hole diameter;
said third hole being interposed between, and essentially registering to said hole regions of said first hole in said holder so as to form a first passage through said holder walls and one of said steering knuckle wall portions, and said fourth hole being interposed between, and essentially registering to said hole regions of said second hole in said holder, so as to form a second passage through said holder walls and the other of said steering knuckle wall portions;
a first screw having a first head, a first shank and a first threaded region on said first shank;
said first shank being of a second diameter which fits into said first hole diameter, and extending through one of said first and second passages;
a first nut being screwed onto said first threaded region and tightened so as to press said holder walls and said steering knuckle wall portion together;
a second adjusting screw bolt having a second head, a second shank and a second threaded region, said second shank extending through the other of said first and second passages through said holder walls and the other of said steering knuckle wall portions;
said second head having a marking indicating an angular position of said second screw bolt,
said second shank having a first shank section adjacent to said second head and extending through said first hole region and engaging a wall thereof,
a second shank section forming a cam adjacent to said first shank section and extending through one of said third and fourth holes and engaging a wall thereof, a third shank section adjacent to said second shank section and extending through said second hole region and engaging a wall thereof, and
  a fourth shank section adjacent to said third shank section and including said second threaded region,
    said second and fourth shank sections being of said second diameter and defining a first axis;
    said first and third shank sections being of a third diameter and defining a second axis;
      said third diameter being less than said second diameter by a value;
    said first axis being offset by about half said value to said second axis;
  said offset being related to said marking on said second head, and together with the angular position of said second screw bolt determining said camber adjustment which can be adjusted by turning the bolt;
a second nut being screwed onto said second threaded region and tightened so as to press said holder walls and said steering knuckle wall portion together and fix said camber adjustment.

* * * * *

UNITED STATES PATENT AND TRADEMARK OFFICE
CERTIFICATE OF CORRECTION

PATENT NO.     : 6,302,416 B1  
DATED          : October 16, 2001  
INVENTOR(S)    : Bernhard Schmack It is certified that error appears in the above-identified patent and that said Letters Patent is hereby corrected as shown below:

Column 1,  
Between Lines 54 and 55, insert -- Brief Description of the Drawings --.

Column 2,  
Before Line 1, insert -- Detailed Description of the Preferred Embodiment --.

Column 5,  
Line 57, change "portion" to -- portions --.

Column 6,  
Lines 5, 7 and 9, after "displacement" insert -- of the axis-displaced shanks --.

Signed and Sealed this

Fourth Day of February, 2003

JAMES E. ROGAN  
*Director of the United States Patent and Trademark Office*